United States Patent
Sato et al.

(10) Patent No.: US 6,388,966 B2
(45) Date of Patent: May 14, 2002

(54) OPTICAL INFORMATION RECORDING AND REPRODUCING APPARATUS

(75) Inventors: Mitsuru Sato; Takanori Maeda, both of Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/730,924

(22) Filed: Dec. 6, 2000

(30) Foreign Application Priority Data

Feb. 17, 2000 (JP) ........................................ 2000-039009

(51) Int. Cl.$^7$ ................................................ G11B 7/00
(52) U.S. Cl. ................................ 369/47.16; 369/53.31; 369/59.11; 369/116
(58) Field of Search .......................... 369/44.23, 44.37, 369/47.1, 47.15, 47.16, 47.2, 47.24, 47.5, 53.1, 53.31, 53.33, 59.1, 59.11, 116

(56) References Cited

U.S. PATENT DOCUMENTS 5,257,256 A * 10/1993 Terao et al. ................ 369/116
5,570,334 A * 10/1996 Kim ........................ 369/112.12
5,848,045 A * 12/1998 Kirino et al. .............. 369/47.53

* cited by examiner

Primary Examiner—Muhammad Edun
(74) Attorney, Agent, or Firm—Perman & Green, LLP

(57) ABSTRACT

An optical information recording and reproducing apparatus is provided that is capable of preventing recorded data from being deleted by mistake under a recording operation mode, and, under a reproduction operation mode, is capable of highly accurately reproducing and reading information data in which crosstalk has been removed. Under the reproduction operation mode, a single laser beam is divided into a plurality of divided laser beams, and they are individually irradiated onto a recording medium. On the other hand, under the recording operation mode, the quantity of light of each divided laser beam other than one beam of all the divided beams is reduced lower than that of the one beam, and they are all irradiated onto the recording medium.

12 Claims, 6 Drawing Sheets

OPTICAL INFORMATION RECORDING AND REPRODUCING APPARATUS

BACKGROUND OF THE INVENTION

1. Field of the Invention

The present invention relates to an optical information recording and reproducing apparatus which is capable of recording information data on an optical recording medium and reproducing it therefrom.

2. Description of the Related Art

In order to read recorded information with high accuracy from an optical recording medium in which the information is recorded in a high-density state, it is necessary to exclude the influence of crosstalk exerted from tracks contiguous to both sides of a target track to be read.

To remove such crosstalk, in a pickup optical system, a laser beam is divided into three by means of, for example, a grating element so as to generate three laser beams, then irradiating the beams onto the target track and the contiguous tracks, whereby, the recorded information is read from three tracks simultaneously. Thereafter, a crosstalk component that has been superimposed in a readout signal that has been read from the target track is calculated, based on a readout signal that has been read from each of the contiguous tracks. The crosstalk component is then subtracted from the readout signal that has been read from the target track so as to remove the crosstalk.

When, however, the aforementioned optical system is also used to record information data on a target track, such a problem occurs that the laser beam is irradiated onto not only the target track but also contiguous tracks thereto and therefore the already recorded data on the contiguous tracks will be deleted because of the irradiation of the recording spot onto those contiguous tracks.

SUMMARY OF THE INVENTION

The present invention has been conceived to solve such a problem as mentioned above, and it aims to provide an optical information recording and reproducing apparatus which is capable of preventing recorded data from being unwontedly deleted within a recording operation mode and is capable of reading information with high accuracy as a result of the removal of crosstalk in the reproduction operation mode.

An optical information recording and reproducing apparatus according to the present invention is an optical information recording and reproducing apparatus for recording information on a recording medium and reproducing the information therefrom by irradiating a beam of light onto the recording medium. The apparatus has a laser generating element that generates a single laser beam and a laser beam irradiating means for, within a reproduction operation mode, dividing the laser beam into a plurality of divided laser beams and irradiating the laser beams individually toward a target track of the recording medium and, within a recording operation mode, reducing the quantity or amount of light of all but one beam of the laser beams in comparison with that one beam and irradiating them all onto the recording medium.

DETAILED DESCRIPTION OF THE PREFERRED EMBODIMENTS

Embodiments of the present invention will be described hereinafter.

Figure 1:
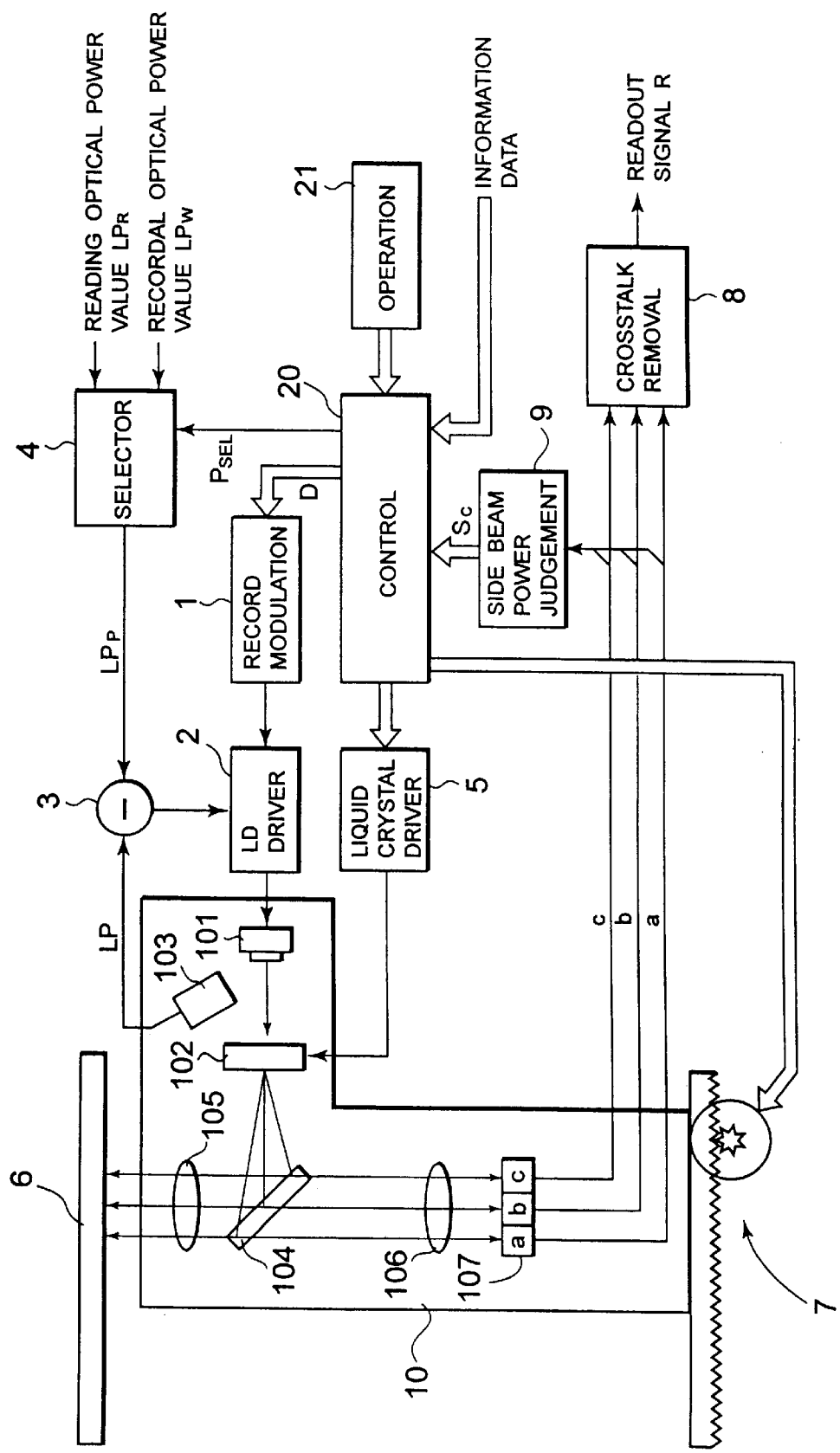
FIG. 1 shows a construction of an optical information recording and reproducing apparatus according to the present invention.

FIG. 1 shows a construction of the optical information recording and reproducing apparatus of the present invention.

In FIG. 1, a record modulation circuit 1 applies an appropriate modulation processing to information data D supplied from a control circuit 20 which will be described later, and supplies a recording signal carrying thereon the modulated information data to a laser driver 2. The laser driver 2 generates a laser driving signal that has a signal level corresponding to the recording signal and supplies the laser driving signal to a laser generating element 101 mounted in a recording and reproducing head 10. The maximum value of the laser driving signal is adjusted in accordance with an optical power error value supplied from a subtracter 3 which will be described later.

The laser generating element 101 generates a laser beam that has an optical power corresponding to the laser driving signal supplied from the laser driver 2 and irradiates the laser beam to a liquid crystal panel 102. An optical power detector 103 detects the optical power of the laser beam and supplies an optical power value LP, which indicates the level of the detected optical power, to a subtracter 3. The subtracter 3 supplies a differential value between a target optical power value $LP_P$ supplied from a selector 4 and the optical power value LP to the laser driver 2, the differential value being an optical power error value. The selector 4 selects either a read-optical power value $LP_R$ or a record-optical power value $LP_W$ in accordance with an optical power selection signal $P_{SEL}$ supplied from a control circuit 20, and supplies the selected value to the subtracter 3 as a target optical power value $LP_P$. The read-optical power value $LP_R$ is an optimum optical power of a laser beam that should be irradiated onto a recording disk in an information reading operation mode, and the record-optical power value $LP_W$ is the optical power of a laser beam needed in an information recording operation mode or an information deleting operation mode.

Therefore, according to the thus formed construction, the laser generating element 101 generates a laser beam that has an optical power indicated by the reading optical power value LPR in the information reading operation mode and irradiates this laser beam to the liquid crystal panel 102. On the other hand, in the information recording operation mode or information deleting operation mode, the laser generating element 101 generates a laser beam that has an optical power indicated by the recordal optical power value $LP_W$ and irradiates this laser beam to the liquid crystal panel 102.

Figure 2:
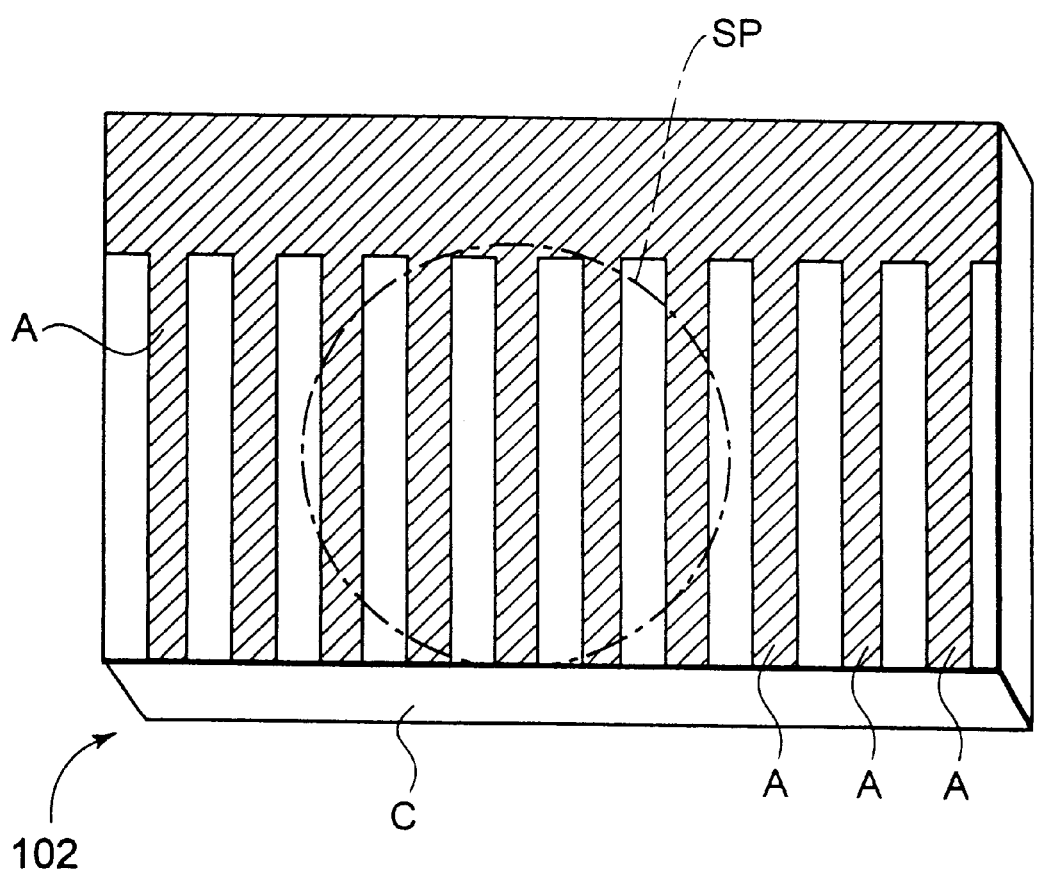
FIG. 2 shows a structure of a liquid crystal panel 102.

FIG. 2 shows a structure of the liquid crystal panel 102 viewed from the optical axial direction of the laser beam.

As shown in FIG. 2, the liquid crystal panel 102 includes stripe-shaped transparent electrodes A and a liquid crystal layer C filled with liquid crystal molecules that have double refraction characteristics.

A liquid crystal driver 5 applies a predetermined liquid crystal driving potential to the transparent electrodes A of the liquid crystal panel 102 when a three-beam generation demand signal is supplied from the control circuit 20, so that it results in changes of the twist angle of liquid crystal molecules that exist in a region covered with the transparent electrodes A among the liquid crystal molecules filled in the liquid crystal layer C. In this instance, the transparent electrodes A of the liquid crystal panel 102 as shown in FIG. 2 become a diffraction grating, and the liquid crystal panel 102 functions as a so-called grating element. Therefore, as shown in FIG. 2, when a beam spot SP formed by a laser beam is irradiated onto the liquid crystal panel 102, first-order diffracted light in addition to zero-order diffracted light is generated by the diffraction grating. At this moment, the zero-order diffracted light and the first-order diffracted light are guided to a half mirror 104 as a main beam and as two side beams, respectively.

The liquid crystal driver 5 applies, for example, 0 volts to the transparent electrodes A when it receives a one-beam generation demand signal is supplied from the control circuit 20, so that the liquid crystal panel 102 becomes a mere glass plate. Accordingly, the laser beam from the laser generating element 101 passes through the liquid crystal panel 102 without any division and is guided to the half mirror 104 as the main beam.

When, namely, a predetermined liquid crystal driving potential is applied to the transparent electrodes A, the liquid crystal panel 102, serving as a grating element, divides a laser beam from the laser generating element 101 into a main beam and side beams and supplies the divided beams to the half mirror 104, respectively. On the other hand, when a potential, such as 0 volts, lower than the predetermined liquid crystal driving potential is applied to the transparent electrodes A, the liquid crystal panel 102 supplies a laser beam supplied from the laser generating element 101 without any division to the half mirror 104 in the form of a main beam.

The half mirror 104 guides the main beam and the side beams that have been generated by the liquid crystal panel 102 to an objective lens 105. The objective lens 105 converges the beams and irradiates them onto the recording surface of a recording disk 6, such as a DVD (Digital Versatile Disc)-R, DVD-RW, DVD+RW, or DVD-RAM, that is a recordable optical recording medium. In more detail, the main beam is irradiated to a recording track at the center of three recording tracks that are contiguous to each other on the recording surface of the recording disk 6, and the side beams are irradiated to the remaining recording tracks, respectively, that are contiguous to the center track. Thereafter, three reflected beams of light reflected from the three recording tracks are guided to optical detection surfaces of photodetectors 107a–107c, respectively, through the objective lens 105, the half mirror 104, and a condensing lens 106. The photodetectors 107a–107c convert the three reflected beams condensed by the condensing lens 106 into readout signals a–c, respectively, each of which has a level corresponding to the quantity of light of each of the three reflected beams, and then output the signals a–c. In the output signals a–c, the readout signal b is what has been read from the center track of the three recording tracks, and the readout signals a and c are what have been read from the tracks contiguous to the center track.

A slider mechanism 7 transfers the recording and reproducing head 10, on which the laser generating element 101, the liquid crystal panel 102, the optical power detector 103, the half mirror 104, the objective lens 105, the condensing lens 106, and the photodetector 107 are mounted, in a disk radial direction of the recording disk 6.

Based on the readout signals a and c, a crosstalk removing circuit 8 calculates a crosstalk component superimposed on the readout signal b that has been read from the center recording track and subtract the crosstalk component from the component from the readout signal b so as to obtain a readout signal R which is free from the crosstalk.

Based on the signal level of the readout signal a or readout signal c, a side beam power judging circuit 9 judges whether the optical power of the side beam generated by the liquid crystal panel 102 has become lower than a predetermined value. If the circuit 9 judges that the optical power of the side beam has decreased to the predetermined value, it causes a side beam power judgment signal Sc to take the logical level "1", and, if the circuit 9 judges that the optical power of the side beam is higher than the predetermined value, it causes the side beam power judgment signal Sc to take the logical level "0". Thereafter, the circuit 9 supplies the judgment signal Sc to the control circuit 20. If preferred, the side beam power judging circuit 9 may make the aforementioned judgment based on the signal level of the readout signal b of the main beam.

An operating device 21 is operated by an operator to accept a reproduction mode start operation and a recording mode start operation, and generates a reproduction start instruction signal and a recording start instruction signal that correspond to the respective operations. The operating device 21 supplies the instruction signal to the control circuit 20.

When the reproduction start instruction signal is supplied from the operating device 21, the control circuit 20 causes a reproduction mode for reproducing recorded data from the recording disk 6. On the other hand, when the recording start instruction signal is supplied from the operating device 21, the control circuit 20 causes a recording mode for recording data on the recording disk 6.

Figure 3:
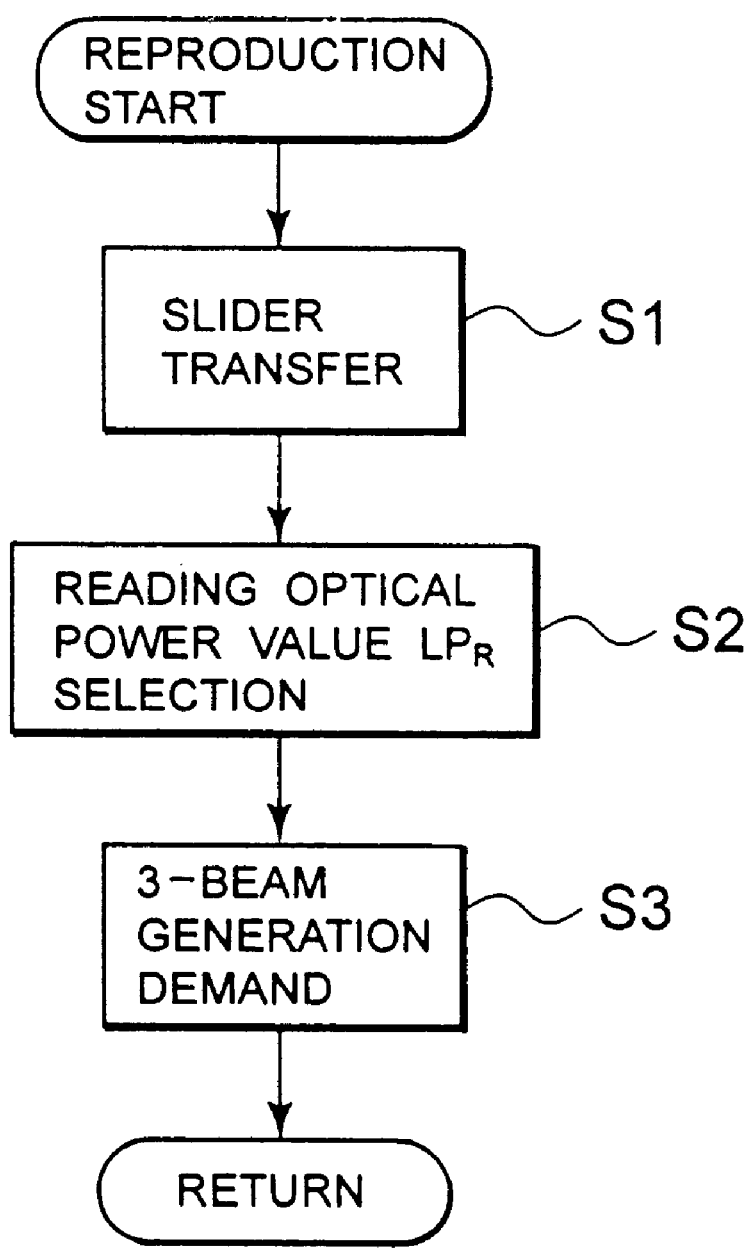
FIG. 3 shows a reproduction start control flow in the optical information recording and reproducing apparatus according to the present invention.

FIG. 3 shows the schematic flow of the reproduction-mode control executed by the control circuit 20 when the reproduction start instruction signal is supplied from the operating device 21.

In FIG. 3, the control circuit 20 first supplies to the slider mechanism 7 a slider-transferring signal for transferring the recording/reproducing head 10 to a desired reproducing start position on the recording disk 6 (step S1). Then, the control circuit 20 supplies to the selector 4 an optical power selection signal $P_{SEL}$ for selecting the read-optical power value $LP_R$ as the optical power of a laser beam to be irradiated onto the recording surface of the recording disk 6 (step S2). By carrying out the step S2, the laser generating element 101 generates a laser beam that has an optical power indicated by the read-optical power value $LP_R$ optimal in reading information. The laser generating element 101 then irradiates this laser beam to the liquid crystal panel 102. Thereafter, the control circuit 20 supplies a three-beam generation demand signal to the liquid crystal driver 5 (step S3). By carrying out step S3, the liquid crystal driver 5 applies a predetermined liquid crystal driving potential to the transparent electrodes A of the liquid crystal panel 102. As a result, the liquid crystal panel 102 generates three beams that are one main beam and two side beams. At this moment, the side beams are each required to have such a quantity of light so as to enable the crosstalk removing circuit 8 to perform the crosstalk elimination process. The three beams are irradiated to three recording tracks, respectively, which are contiguous to each other on the recording surface of the recording disk through the half mirror 104 and the objective lens 105. Thus, readout signals a–c are obtained that correspond to three reflected beams, respectively, that have been reflected from the three recording tracks. A readout signal R from which the crosstalk has been removed by the crosstalk removing circuit 8 is output finally.

Highly accurate information reading in which the influence of the crosstalk from the neighboring tracks has been excluded is performed by simultaneously reading recorded information from the three recording tracks contiguous to each other on the recording surface of the recording disk 6 in the reproduction operation mode in this way.

Figure 4:
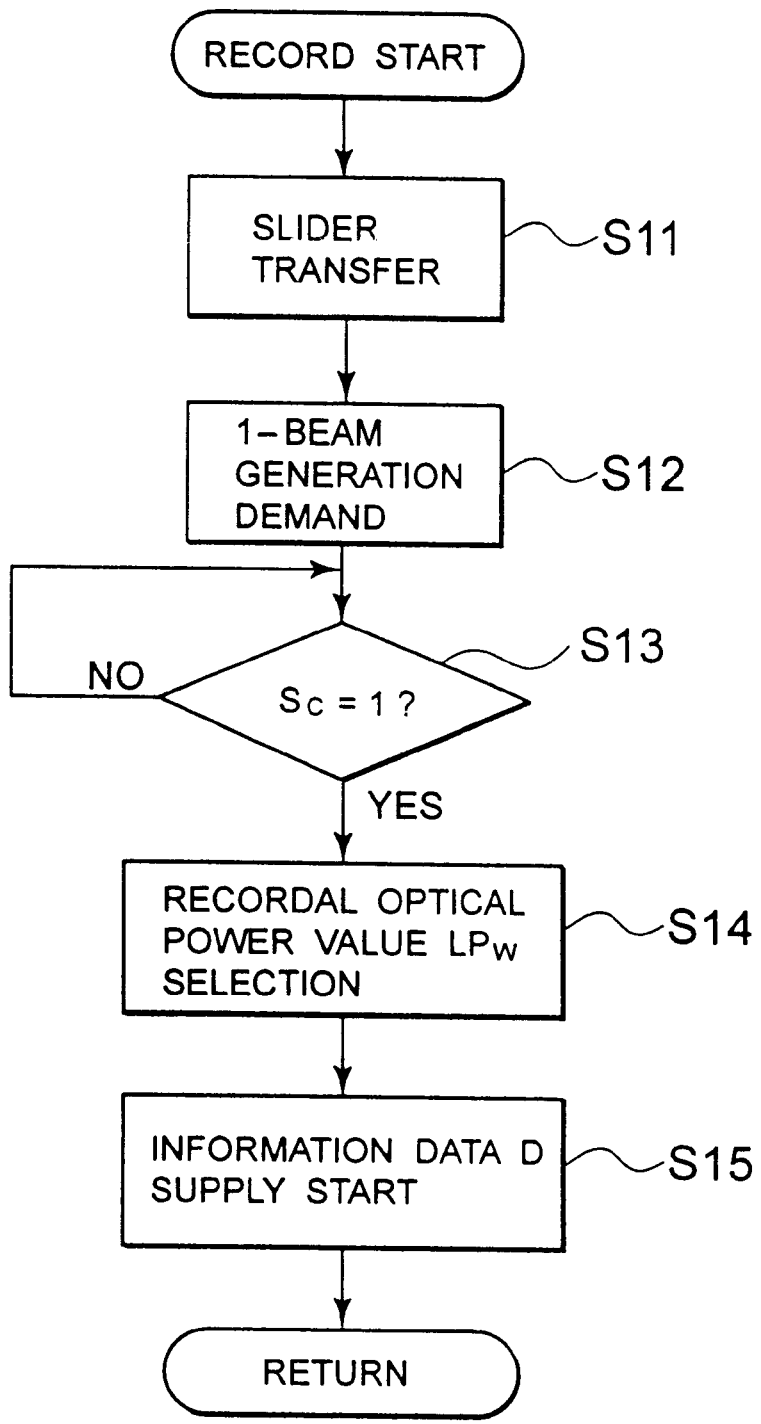
FIG. 4 shows a record start control flow in the optical information recording and reproducing apparatus according to the present invention.

On the other hand, FIG. 4 shows the schematic flow showing the recording mode control executed by the control circuit 20 when a recording start instruction signal is emitted from the operating device 21.

In FIG. 4, the control circuit 20 first supplies to the slider mechanism 7 a slider transferring signal for transferring the recording and reproducing head 10 to a desired reproducing start position on the recording disk 6 (step S11). Thereafter, the control circuit 20 supplies a one-beam generation demand signal to the liquid crystal driver 5 (step S12). By carrying out step S12, the liquid crystal driver 5 applies a potential of 0 volts to the transparent electrodes A of the liquid crystal panel 102. Thus, the liquid crystal panel 102 reduces the quantity of light of the side beams among the three beams in comparison with that of the main beam. In other words, by carrying out step S12, the liquid crystal panel 102 substantially extinguishes the side beams so as to shift to a one-beam generation state of only the main beam.

Then, the control circuit 20 continues to judge whether the side beam power judgment signal Sc supplied from the side beam power judging circuit 9 is logical level "1" or not until the judgment signal Sc is judged as logical level "1" (step S13). In other words, it waits is until the optical power of the side beam decreases to a predetermined value after applying the potential of 0 volts to the transparent electrodes A of the liquid crystal panel 102.

When the side beam power judgment signal Sc is judged to be the logical level "1" in step S13, the control circuit 20 controls the optical power selection of a laser beam to be irradiated onto the recording surface of the recording disk 6. That is, the control circuit 20 supplies an optical power selection signal $P_{SEL}$ for selecting the recordal optical power value $LP_W$ to the selector 4 (step S14). By carrying out step S14, the laser generating element 101 generates a laser beam that has an optical power indicated by the recordal optical power value $LP_W$ that is required when information data is recorded. This laser beam is then irradiated onto the liquid crystal panel 102. Then, the control circuit 20 initiates to supply information data D, which corresponds to an inputted information signal, to the record modulation circuit 1 (step S15). By carrying out steps S14 and S15, only the laser beam that has the optical power indicated by the recordal optical power value $LP_W$ is irradiated onto one recording track of the recording disk 6 as a main beam, so that an information signal that corresponds to the information data D is recorded. Since, at this moment, the two side beams have been substantially extinguished by step S12, recorded data is prevented from being deleted even though the two side beams are irradiated onto the recording surface.

As mentioned above, in the optical information recording and reproducing apparatus shown in FIG. 1, the single laser beam generated by the laser generating element 101 is guided to the recording surface of the recording disk 6 through the liquid crystal panel 102. The liquid crystal panel 102 divides the single laser beam generated by the laser generating element 101 into three laser beams that are one main beam and two side beams, and supplies them to the recording disk 6, respectively.

In the reproduction operation mode of the optical information recording and reproducing apparatus, the crosstalk removal that uses readout signals simultaneously read from the three recording tracks contiguous to each other that are formed on the recording surface of the recording disk 6 is carried out by the three laser beams.

On the other hand, in shifting from the reproduction operation mode to the recording operation mode in the optical information recording and reproducing apparatus, the quantity of light of each of the two side beams is first reduced, and then the optical power of the laser beam is switched from the reading optical power value $LP_R$ to the recordal optical power value $LP_W$ so as to start recording on the recording disk 6. This operation prevents data from being deleted even though the side beam are irradiated onto the recording track on which the data is recorded. Herein, the liquid crystal panel 102 consumes a time period T1 shown in FIG. 5 from the emission of the one-beam generation demand signal to the substantial extinguishment of the side beam because the speed of response is slow. If, therefore, the switching operation of the optical power of the laser beam is waited until the side beam is extinguished, a too much time will be consumed until the start of the recording on the disk 6.

Figure 5:
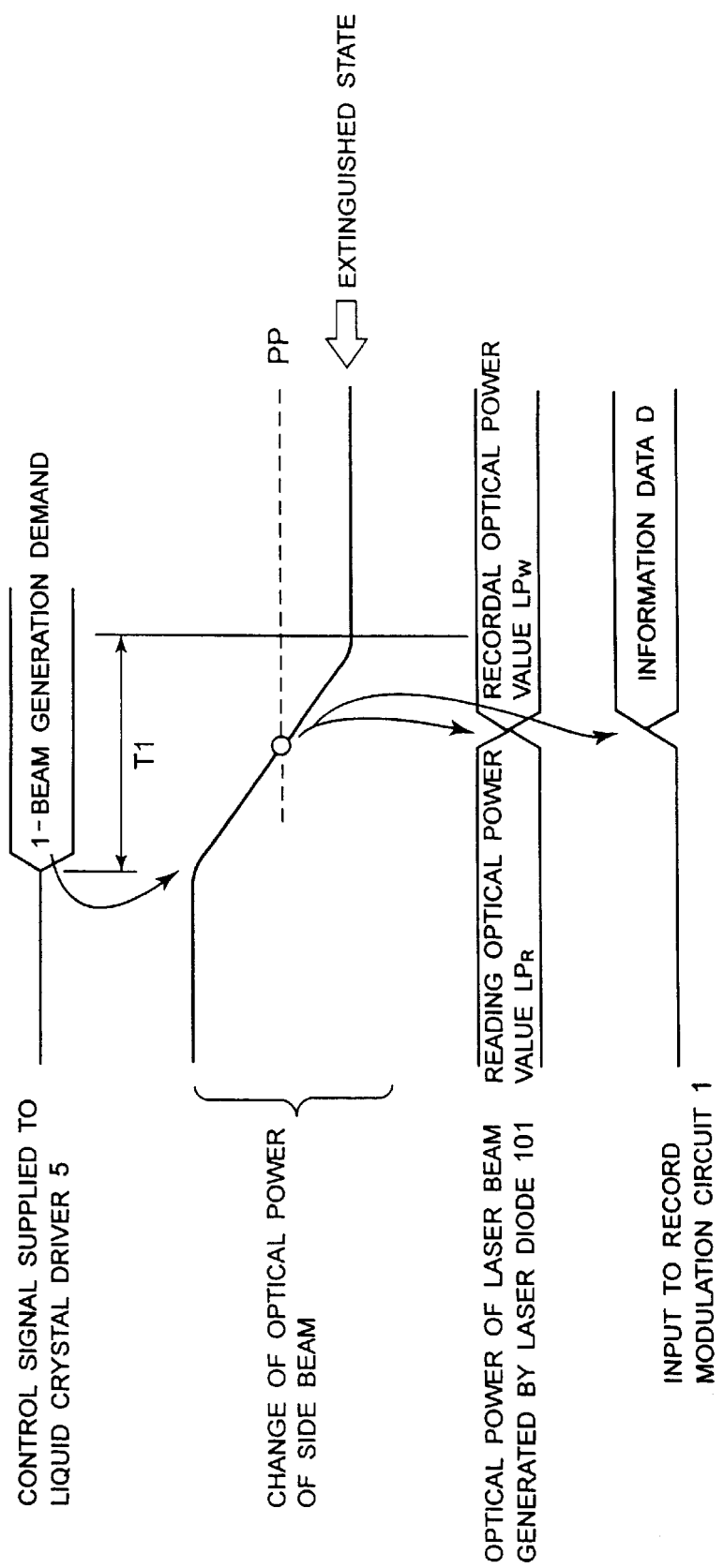
FIG. 5 shows operation timing at the start of recordal.

Therefore, according to the present invention, the optical power of a laser beam to be generated by the laser generating element 101 is designed to be switched to a record-optical power value $LP_W$ when the optical power of a side beam becomes lower than an optical power value PP shown in FIG. 5 even if the side beam is not extinguished completely. Herein, the fact that the optical power of the side beam has become lower than the optical power value PP means that the generation efficiency of the side beam generated by the liquid crystal panel 102 has decreased to such an extent that recorded data cannot be deleted by the side beam even if the laser beam that has the record-optical power value $LP_W$ begins to be irradiated at this time. Therefore, according to this control, a shift from the reproduction operation mode to the recording operation mode can be carried out swiftly without waiting for extinction of the side beam.

Since the response time of the liquid crystal panel 102 is changed in dependence on the atmospheric temperature, the optical power of a laser beam to be generated by the laser generating element 101 may be switched after the expiration of the predicted response time that corresponds to the atmospheric temperature.

Figure 6:
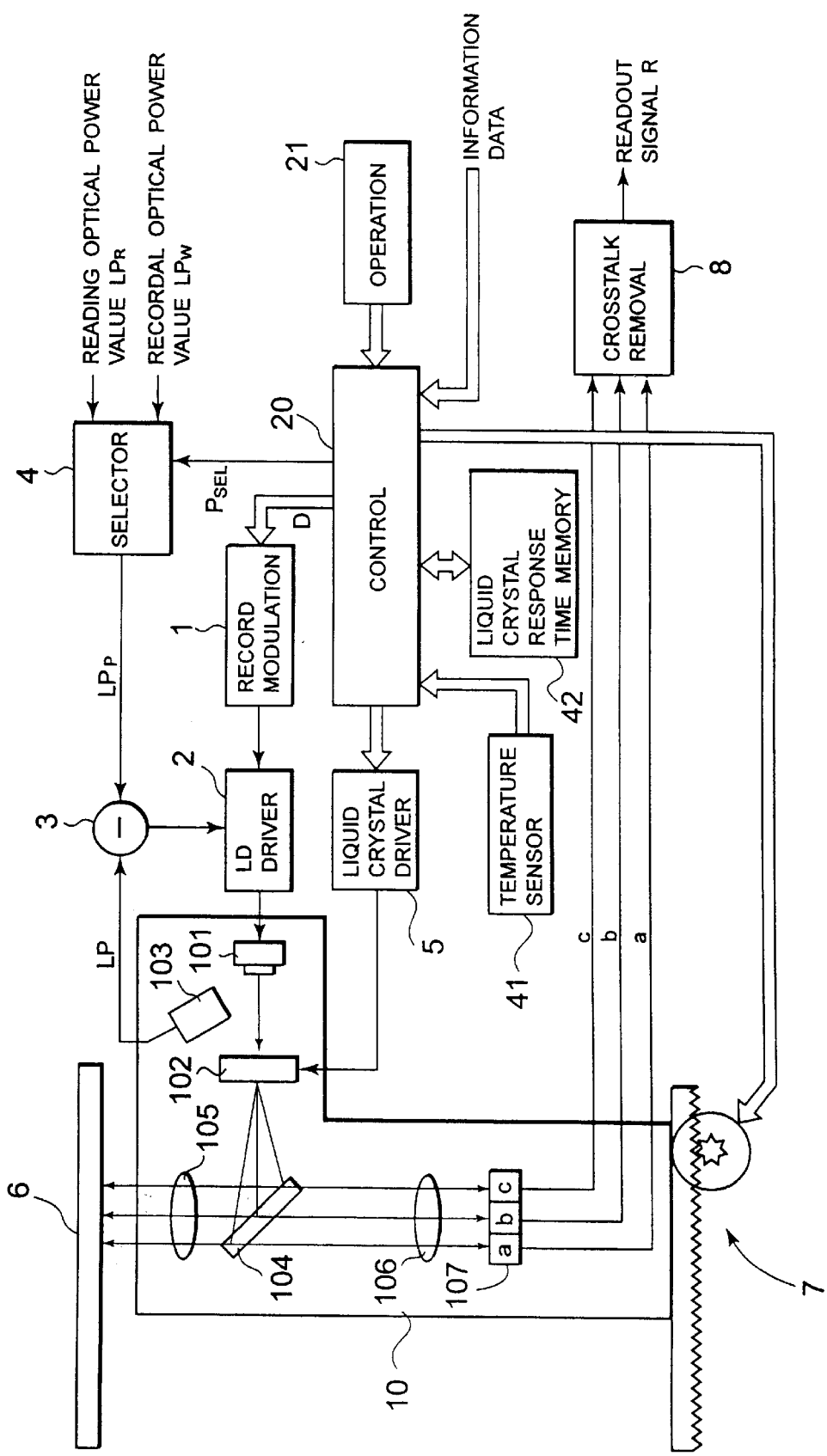
FIG. 6 shows a construction of the optical information recording and reproducing apparatus of another embodiment of the present invention.

FIG. 6 shows a construction of the optical information recording and reproducing apparatus according to another embodiment of the present invention that has been made in view of the above.

The optical information recording and reproducing apparatus shown in FIG. 6 is different from that of FIG. 1 in that the side beam power judging circuit 9 is omitted and a temperature sensor 41 for measuring the atmospheric temperature and a liquid crystal response time memory 42 are provided. The predicted response time of a liquid crystal element is preserved corresponding to each temperature in the liquid crystal response time memory 42. After step S12 shown in FIG. 4 is carried out, the control circuit 20 reads the liquid crystal response time that corresponds to a temperature measured by the temperature sensor 41 from the liquid crystal response time memory 42 and the stage proceeds to the next step S14 after the lapse of the read response time.

In this embodiment, in the recording operation mode, the side beam is substantially extinguished by applying a liquid crystal driving potential of 0 volts to the transparent electrodes A of the liquid crystal panel 102. However, the side beam does not necessarily need to be extinguished. In fact, in the recording operation mode, the driving control liquid crystal panel 102 is merely required to be driven and controlled so as to reduce the quantity of light of the side beam to such an extent that recorded data cannot be deleted at least. In other words, the potential to be applied to the transparent electrodes A of the liquid crystal panel 102 may be other than that of 0 volts.

As described above in detail, according to the optical information recording and reproducing apparatus of the present invention, recorded data can be prevented from being deleted in the recording operation mode, and, in the reproduction operation mode, the data can be reproduced in a highly accurate state in which a crosstalk has been removed.

The present invention has been described above with reference to the preferred embodiments. Any person skilled in the art should understand that the present invention can be variously modified or varied without departing from the spirit of this disclosure and the scope of the appended claims. Such modifications or variants are all to be covered by the appended claims.

What is claimed is:

1. An optical information recording and reproducing apparatus for recording information on a recording medium and reproducing the information from the recording medium by irradiating a beam onto the recording medium, which comprises:

a laser generating element for generating a single laser beam; and a laser beam irradiating means for, in a reproduction operation mode, dividing the laser beam into a plurality of divided laser beams and irradiating the divided laser beams onto the recording medium individually, while, in a recording operation mode, decreasing quantity of light of all but one beam of the divided beams so as to be lower than that of the one beam and irradiating the divided laser beams onto the recording medium.

2. The optical information recording and reproducing apparatus as set forth in claim 1, wherein said laser beam irradiating means includes:

a liquid crystal panel in which stripe-shaped transparent electrodes are formed on a liquid crystal layer filled with liquid crystals that have double refraction characteristics;

and a liquid crystal driving means for, in the reproduction operation mode, applying a predetermined first potential to the transparent electrodes and, in the recording operation mode, applying a second potential that is lower than the first potential to the transparent electrodes.

3. An optical information recording and reproducing apparatus for recording information on a recording medium and reproducing the information from the recording medium by irradiating a beam onto the recording medium, which comprises:

a laser generating element for generating a single laser beam;

a laser beam irradiating means for dividing the single laser beam into a main beam and secondary beams and irradiating the main and secondary beams simultaneously onto respective recording tracks, that are formed contiguously to each other on a recording surface of the recording medium; and control means for controlling said laser beam irradiating means so as to reduce the quantity of light of the secondary beams to become lower than that of the main beam under a recording operation mode.

4. The optical information recording and reproducing apparatus as set forth in claim 3, wherein said laser beam irradiating means includes:

a liquid crystal panel having stripe-shaped transparent electrodes formed on a liquid crystal layer filled with liquid crystals that have double refraction characteristics; and liquid crystal driving means for, in a reproduction operation mode, applying a predetermined first potential to the transparent electrodes and, in the recording operation mode, applying a second potential that is lower than the first potential to the transparent electrodes.

5. The optical information recording and reproducing apparatus as set forth in claim 3, further comprising:

a photodetector for converting reflected light obtained when the main beam is irradiated onto the recording medium into a first readout signal that has a level corresponding to a quantity of the reflected light of the main beam and converting reflected light obtained when the secondary beam is irradiated onto the recording medium into a second readout signal that has a level corresponding to the quantity of the reflected light of the secondary beam; and a crosstalk removing circuit for obtaining a readout signal in which a crosstalk from a contiguous track has been removed such that a crosstalk component superimposed on the first readout signal is calculated based on the second readout signal and then the crosstalk component is subtracted from the first readout signal.

6. The optical information recording and reproducing apparatus as set forth in claim 5, wherein the secondary beam has such a quantity of light as to enable said crosstalk removing circuit to calculate the crosstalk component superimposed on the first readout signal based on the second readout signal.

7. An optical information recording and reproducing apparatus for recording information on a recording medium and reproducing the information from the recording medium by irradiating a beam onto the recording medium, which comprises:

a laser generating element for generating a single laser beam;

laser beam irradiating means for dividing the single laser beam into a main beam and a secondary beam and irradiating the main and secondary beams simultaneously onto recording tracks, respectively, that are formed contiguously to each other on a recording surface of the recording medium;

control means for controlling said laser beam irradiating means so as to reduce a quantity of light of the secondary beam to be lower than that of the main beam in a recording operation mode; and laser power adjusting means for, in a reproduction operation mode, adjusting an optical power of the laser beam generated by said laser generating element to a first optical power value optimal for reading information, and, in a shift from the reproduction operation mode to the recording operation mode, switching the optical power of the laser beam generated by said laser generating element to a second optical power value needed for recording the information after an optical power of the secondary beam has decreased to a predetermined value.

8. The optical information recording and reproducing apparatus as set forth in claim 7, wherein the predetermined value is an optical power value smaller than a value of an optical power by which data recorded on the recording medium is deleted when the secondary beam is irradiated onto the recording medium.

9. The optical information recording and reproducing apparatus as set forth in claim 7, wherein said laser beam irradiating means comprises: a liquid crystal panel in which stripe-shaped transparent electrodes are formed on a liquid crystal layer filled with liquid crystals that have double refraction characteristics; and liquid crystal driving means for, under the reproduction operation mode, applying a predetermined first potential to the transparent electrodes and, under the recording operation mode, applying a second potential that is lower than the first potential to the transparent electrodes.

10. The optical information recording and reproducing apparatus as set forth in claim 7, further comprising:

a photodetector for converting reflected light obtained when the main beam is irradiated onto the recording medium into a first readout signal that has a level corresponding to a quantity of the reflected light of the main beam and converting reflected light obtained when the secondary beam is irradiated onto the recording medium into a second readout signal that has a level corresponding to a quantity of the reflected light of the secondary beam; and a crosstalk removing circuit for obtaining a readout signal in which a crosstalk from a contiguous track has been removed by calculating a crosstalk component superimposed on the first readout signal based on the second readout signal and then subtracting the crosstalk component from the first readout signal.

11. The optical information recording and reproducing apparatus as set forth in claim 10, wherein the secondary beam has such a quantity of light as to enable said crosstalk removing circuit to calculate the crosstalk component superimposed on the first readout signal based on the second readout signal.

12. The optical information recording and reproducing apparatus as set forth in claim 7, wherein said laser power adjusting means judges whether or not the optical power of the secondary beam has decreased to the predetermined value based on a level of the first or second readout signal.

* * * * *